Dec. 9, 1947.  P. F. DARBY  2,432,390
TESTING MACHINE
Filed April 4, 1945
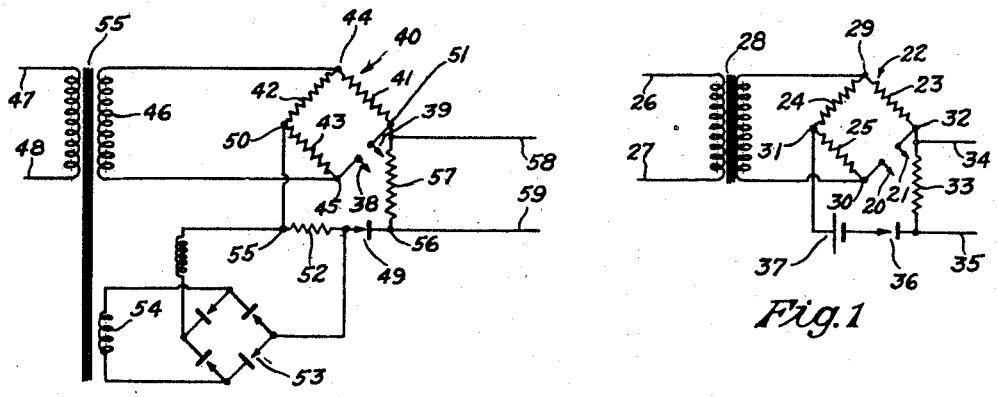
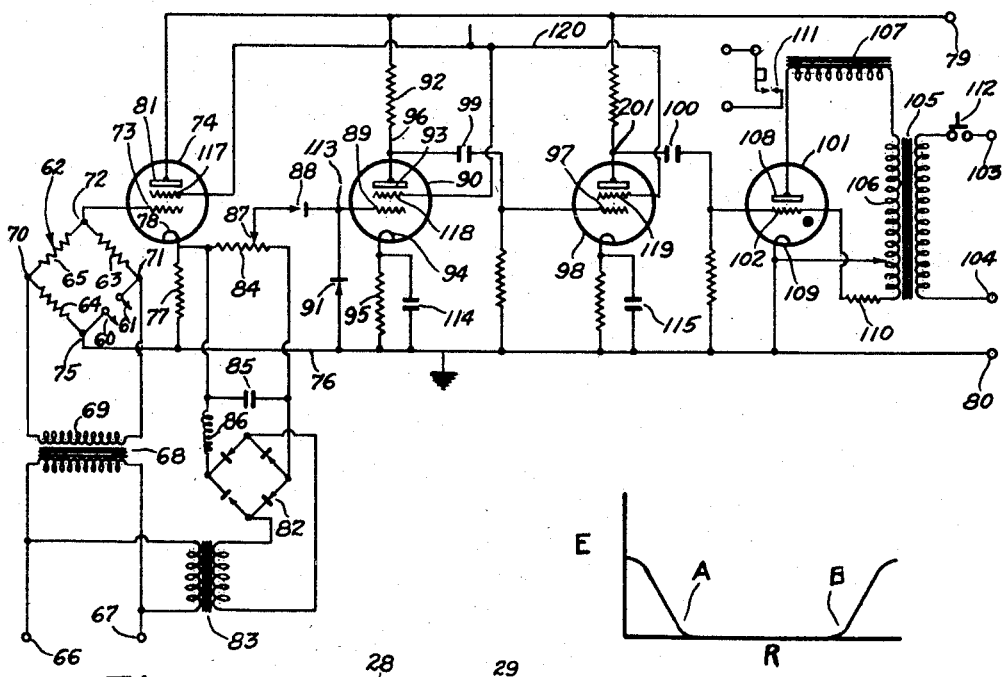
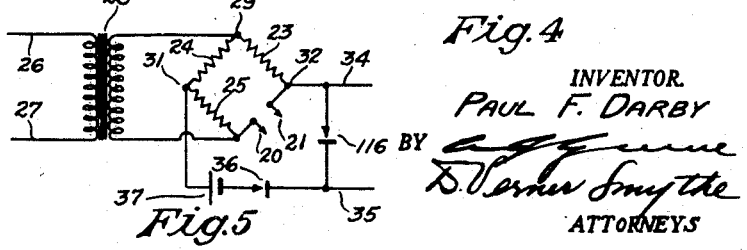
INVENTOR.
PAUL F. DARBY
BY
ATTORNEYS Patented Dec. 9, 1947

2,432,390

UNITED STATES PATENT OFFICE 2,432,390

TESTING MACHINE

Paul F. Darby, Fairfield, Conn., assignor to Remington Arms Company, Inc., Bridgeport, Conn., a corporation of Delaware Application April 4, 1945, Serial No. 586,476

14 Claims. (Cl. 175—320)

1

This invention relates to a machine and circuit for testing the electrical resistance or conductivity of an article and is particularly directed to a circuit for operating a machine to separate articles having a desired resistance from articles having a resistance above or below an acceptable standard. It is useful especially in the production testing of electrically operated ammunition primers of the type not having a wire therein which depend upon the resistance of the explosive material itself to a passage of current in order to ignite the primer.

A detailed description of a machine per se in which the circuit may be used is given in copending application, Serial No. 555,446, filed September 23, 1944.

In a circuit for the operation of mechanism to assort articles in accordance with resistance value or electrical conductivity, it is desirable to be able to detect accurately and without failure, departures from predetermined standards. The circuit described herein operates on an insufficient or an excess flow of current through an article to be tested, the article being moved in a dial and temporarily inserted in the circuit as described in said aforementioned copending application. The current used must be small so that the primer will not be exploded or operated in the testing circuit. The limited current or voltage complicates the problem in obtaining accurate readings and indications where relatively close limits must be kept.

These and other objects of the invention will become apparent from the following description and drawings:

In the drawings—

Fig. 1 is a simplified circuit diagram of one form of the invention.

Fig. 2 is a simplified circuit diagram of a modified form of the invention.

Fig. 3 is a detailed circuit diagram of one form of the invention in conjunction with an amplifier and relays.

Fig. 4 is a graph showing the desired voltage characteristics of the device.

Fig. 5 is a modification of the circuit of Fig. 1.

In the present invention, the primer or article to be tested is inserted in the circuit wherein a relay will be actuated if the resistance of the primer or article is above or below a predetermined value. If the resistance of the article is within predetermined limits, the relay will not be operated. As described in said aforementioned copending application, the operation of the relay will govern whether the articles are carried to a rejected group or to an acceptable group.

In Fig. 1 an article to be tested is inserted in the circuit across terminals 20, 21 of the Wheatstone bridge 22. Said bridge includes resistances 23, 24 and 25. A source of alternating current is supplied across terminals 26 and 27 to transformer 28, transformer 28 being connected to junctions 29 and 30 of the Wheatstone bridge. The signal obtained at opposite junctions 31 and 32 of the bridge is impressed across signal resistance 33. Leads 34 and 35 may be connected to control the grid voltage of a suitable amplifier circuit, similar to that which will be described hereafter, for the operation of a relay. In the signal circuit, there is a rectifier 36 which may be a copper oxide rectifier or a similar type such as selenium or a "Tungar" bulb. Battery 37 is placed in the signal circuit in opposition to the direction that rectifier 36 will allow current to pass. It thus becomes apparent that the portions of the source of alternating current which will be passed by the rectifier 36 must be sufficiently high to counteract the opposing voltage of battery 37 before a signal will be impressed across leads 34 and 35 through signal resistance 33. The resistance 33 should be small relative to the inverse resistance of the rectifier. The bridge will operate on an unbalance in either direction of the article placed across terminals 20 and 21 because one of the positive pulses will flow through the rectifier from the terminals 31 and 32. The phase is different but this is immaterial as far as the operation of the circuit is concerned. The values of the various resistances and the battery are chosen so that the relations shown in Fig. 4 will be obtained. For the range of article resistance between A and B, the value of the battery voltage should be such that there will be no voltage across the signal resistance. When the resistance is above or below a predetermined amount, the voltage across terminals 31 and 32 should be greater than that of the battery so that there will be a potential as shown in the diagram of Fig. 4 to the left and right of A and B, respectively.

Fig. 2 shows an alternative form of circuit, wherein the battery is replaced by a copper oxide or similar type rectifier bridge or source of direct current. The rectifier bridge circuit is supplied from the same transformer as the Wheatstone bridge so that any variations in supply of alternating voltage automatically will be compensated. The article to be tested is placed across terminals 38, 39 of the Wheatstone bridge 40.

The bridge has resistances 41, 42 and 43 with an alternating current supply source connected to bridge terminals 44 and 45 from transformer secondary 46. Transformer 55 is supplied from alternating current source through leads 47 and 48. A copper oxide or similar rectifier is provided at 49, arranged so that current can flow only from left to right (Fig. 2). The signal circuit is connected across terminals 50 and 51 of the bridge. Resistance 52 is in the signal circuit and is across rectifier bridge 53 of conventional structure. Said rectifier bridge 53 is energized from secondary 54 also located on the transformer 55. Rectifier bridge 53 may comprise four copper oxide or similar type rectifiers and is connected to provide a direct current opposite to that which can be passed by rectifier 49. The bridge is arranged so that the direction of current will be such that point 55 will be positive, rectifier 49 allowing current to pass from point 55 in the direction of point 56. The voltage drop across resistance 52 is in a direction such that end 55 is more positive than the right hand end. The portion of the alternating wave passed by rectifier 49 must be greater than the opposing potential across resistance 52 placed thereon by rectifier bridge 53. It thus becomes apparent that the rectifier bridge circuit 53 of Fig. 2 performs in a generally similar manner to the battery 37 of Fig. 1. A signal produced across resistance 57 may be connected by means of leads 58 and 59 to an amplifier circuit, which, in turn, can be used to operate a relay.

In Fig. 3, the article to be tested is connected across terminals 60 and 61 of the Wheatstone bridge 62, said bridge having resistances 63, 64 and 65. An alternating current source of supply is connected across terminals 66, 67 to transformer 68. Secondary 69 in said transformer is connected to terminals 70 and 71 of the bridge 62. A potential produced as a result of unbalance in bridge 62 is connected at terminal 72 to the control grid 73 of electronic tube 74. Tube 74 may, for example, be a type 6SJ7. The other signal terminal 75 of the bridge is connected to the grounded lead 76, said lead being connected through resistance 77 to cathode 78 of tube 74. The plate circuit of tube 74 may be supplied from terminals 79 and 80 of a full wave rectifier, said plate circuit being from the rectifier terminal 79, plate 81, cathode 78, resistance 77, ground lead 76, back to terminal 80. Unbalance potentials across the Wheatstone bridge will show up in amplified form in the shape of fluctuations in the potential drop across the cathode resistor 77. Rectifier bridge 82 of the copper oxide or similar type is supplied from transformer 83, said transformer being connected across the alternating current supply 66, 67. Power take-off from said rectifier bridge is connected across resistance 84, condenser 85 and inductance 86 being used in a conventional manner for filter purposes. Adjustable contact 87 is connected through rectifier 88 to the control grid 89 of tube 90. The variable contact 87 is located at a point spaced from the negative end of the resistance 84 so that said point is below ground potential and thus is more negative than the potential of lead 76. For this reason, grid 89 of tube 90 is in a negative condition so as to prevent or provide a minimum flow of current in the plate circuit of tube 90. Tube 90 may be of type 6SJ7.

Under normal conditions, there is a direct current passed through the plate circuit of tube 74, as previously described. When the bridge 72 becomes unbalanced due to the departure of the resistance of an article connected across 60 and 61 beyond a predetermined point, there will be an alternating current impressed on grid 73 so that there will be a composite alternating and direct current in the plate circuit of tube 74. The value of resistance 84 and voltage is so chosen that the positive peaks of the alternating current must be above a predetermined value in order to raise point 87 to a sufficient positive condition so that current will pass through the rectifier 88 and raise the potential on grid 89 of tube 90 to a point to render said tube more conducting. On the positive half of the wave, no current will pass through rectifier 91 because said rectifier is connected so that flow can only take place from 76 toward junction 113. Rectifier 91 serves to pass the alternating component in the direction toward the grid without developing a signal because of the low resistance of the rectifier in said direction. Rectifier 88 is arranged so that current can pass only from 87 toward the grid 89.

In an alternative explanation of the phenomena involved, it may be noted that under zero signal conditions the line 76 is at a negative potential with regard to either of the cathodes 78 or 94. Consequently, if the grid 89 were connected directly to cathode 78, it would be positive relative to cathode 94 and an increased current would flow in tube 90. The potential across the resistance 84 is adjusted in such a manner as to oppose and exceed the zero signal drop across cathode resistor 77 by an amount equal to the peak value of the fluctuating unbalance potential appearing across resistor 77 when the article in the bridge is of either maximum or minimum allowable resistance. The point 87 will therefore be positive with respect to line 76 only during those intervals of unbalance greater than the allowable amount. During those intervals in which the potential across resistance 84 maintains contact 87 in a negative condition, the rectifier 88 in series opposition to the potential across 84 will reflect its high characteristic inverse resistance while the rectifier 91 will have a low resistance. Under these conditions, the point 113 will be at substantially the potential of line 76, negative with respect to cathode 94 and plate current will be low or entirely cut off. During those intervals in which point 87 is positive with respect to 76, the rectifier 88 in series opposition to the voltage across resistance 84 will exhibit a low resistance while the rectifier 91 will reflect its inverse resistance and the point 113 will be at substantially the potential of point 87, positive with respect to 76, increasing the plate current through tube 90. Obviously the rectifier 91 may be replaced by a resistor having a resistance value between the conducting and inverse resistances of the rectifier with substantially similar results.

The use of the principles of this invention insures a relatively large grid potential change for tube 90 whenever the resistance value being measured falls outside predetermined tolerances. The plate circuit of tube 90 is from connection 79, resistance 92, plate 93, cathode 94, cathode resistance 95, to the ground lead 76. Condenser 114 is a conventional by-pass condenser. When a signal reaches grid 89 to render the tube more conducting with the positive portions of the alternating wave impressed on said grid due to an unbalance in the Wheatstone bridge, there will be an increase in flow of current in the plate circuit of tube 90. This will cause point 96 to become more negative and grid 97 of tube 98 will become more negative and thus reduce the flow of plate current therethrough. As the plate current through tube 98 is reduced, point 201 will become more negative so that grid 102 of tube 101 will become more positive and cause said tube to become conducting or to "fire." Tube 101 may be of the conventional gas filled "Thyratron" or a similar type. Other types of responsive circuits may be used in place of the "Thyratron" tube circuit.

The plate circuit of tube 101 is energized from the alternating source of current connected across terminals 103, 104, and transformer 105. Said plate circuit extends from the secondary 106 of transformer 105 through relay coil 107, plate 108, and cathode 109. Bias for the control 102 of tube 101 is obtained through resistance 110. Relay 107 may have contacts 111 for the purpose of operating a solenoid or other suitable mechanism for performing assorting or other operations, such as described in copending application, Serial No. 555,446.

Blocking condensers 99 and 100 may be provided in the grid circuits in a conventional manner. Screen grids 117, 118 and 119 may be connected to lead 120 which, in turn, is connected to a source of potential in a conventional manner.

A modification of the circuit shown in Fig. 1 is illustrated in Fig. 5 wherein a rectifier 116 of the copper oxide or similar type can replace signal resistance 33, the other reference numerals of Fig. 5 being the same as for Fig. 1. When a rectifier 116 is employed and rectifier 36 is conducting on a positive portion of the alternating wave, rectifier 116 will present a high resistance, inasmuch as it is arranged in an opposite direction to rectifier 36. With a high resistance, a relative large voltage drop will be presented across signal leads 35 and 36. When the alternating current phase is such that rectifier 36 is non-conducting and rectifier 116 becomes conducting, very little voltage will appear between leads 35 and 36.

Summing up operation of the circuit shown in Fig. 3, an article inserted in the bridge circuit, if outside a predetermined resistance limit, will cause an alternating current to be superimposed upon the direct current in the plate circuit of tube 74. When the peaks of this alternating current in either phase are above a predetermined point, the "bucking" potential across resistance 84 will be overcome and grid 89 raised to the point so as to cause tube 90 to become more conducting, rectifier 88 allowing this to occur. Increase of plate current through tube 90 will cause grid 97 of tube 98 to become more negative and therefore reduce the plate current through this tube. When this occurs, grid 102 of the normally non-conducting tube 101 becomes more positive and causes said tube to "fire."

Switch 112 may be provided in the source of supply for the plate circuit of tube 101 so that it can be closed after an article is inserted in the bridge and opened after an article has been tested.

The electric primers inspected with the aid of this invention have a fairly wide range of permissible resistance values within which the product is acceptable. In the interests of economy of production, it is important that every primer falling within those limits be accepted and in the interest of military efficiency it is essential that no primer outside the acceptable range be approved. Thus, although the range within which primers may be accepted is wide, the inspection limits at either end of the acceptable range are quite narrow. If the inspection is to be accomplished by a single operation of a Wheatstone bridge, the range of unbalance potentials is quite wide but the cut-off at the limits must be sharp.

If, for example, the unbalance potentials are applied to the grid of an electronic tube and amplified to expand the critical cut-off regions sufficiently for sharp discrimination, the swing of grid voltage is so wide that the tube must operate below the bend of its transfer characteristic curve as well as near the upper limit of plate current. Operation over these ranges also greatly complicates the problem of maintaining stability in amplification characteristics.

The circuits described herein permit the unbalance potentials to fluctuate through relatively wide ranges but as soon as that potential, either directly or as slightly amplified, exceeds a value at which the bucking potential is outweighed, a strong signal as plotted in Figure 4 is impressed on the signalling portion of the circuit. This signal is of sufficient magnitude and sharpness that it may be amplified with ordinary circuits to any degree necessary for operating the reject relay. The stability problem is simplified by elimination of dependence on maintenance of amplifier stability through several stages. Known principles govern the selection of bridge components of requisite stability.

It will be recognized that circuit details shown herein may be varied without departure from the principles of this invention. Accordingly, it should be realized that this invention is to be considered as limited only to the extent required by the claims appended hereto.

What is claimed is:

1. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; a rectifier and a source of current opposing said rectifier connected across another set of junctions of said bridge; and means responsive to a flow of current in said rectifier connection, said flow being caused by an unbalance in said bridge beyond a predetermined amount.

2. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; a rectifier and a source of current opposing said rectifier connected in series across another set of junctions of said bridge; and means responsive to a flow of current in said rectifier connection, said flow being caused by an unbalance in said bridge beyond a predetermined amount.

3. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; a rectifier; a source of current opposing said rectifier and a signal resistance connected in series across another set of junctions of said bridge; and means responsive to a flow of current through said signal resistance caused by an unbalance in said bridge circuit beyond a predetermined amount.

4. A testing circuit comprising a bridge having four legs and two sets of junctions, one of said legs having an unknown resistance therein; a source of alternating current connected across one set of junctions of said bridge; a rectifier; a battery; a signal resistance; means to connect said rectifier and said battery in opposition to each other and said signal resistance in series across another set of junctions of said bridge; and means responsive to a flow of current in said signal resistance, said flow being caused by an unbalance in said bridge beyond a predetermined amount.

5. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; a rectifier and a full wave rectifier circuit connected in opposition to said first-mentioned rectifier across another set of junctions of said bridge, said full wave rectifier being energized from said alternating current source; and means operative to a flow of current in said rectifier connection caused by an unbalance in said bridge greater than the full wave rectifier opposing current.

6. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; an electronic tube amplifier having a cathode, plate, and control grid; means to connect said control grid to one of the junctions of said bridge; a resistance in the plate-cathode circuit of said electronic tube; a rectifier and a source of direct current potential, said rectifier and direct current potential being connected between said plate-cathode circuit and the control grid of a second electronic tube, the source of potential and rectifier being connected in opposite directions; and means responsive to the flow of current in said second-mentioned electronic tube caused by an unbalance in said bridge beyond a predetermined amount.

7. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; an electronic tube amplifier having a cathode, plate, and control grid; means to connect said control grid to one of the junctions of said bridge; a resistance in the plate-cathode circuit of said electronic tube; a rectifier and a source of direct current potential, said rectifier and direct current potential being connected between said plate-cathode circuit and the control grid of a second electronic tube, the source of potential and rectifier being connected in opposite directions; a normally non-conducting gas filled tube responsive to the flow of current in the plate circuit of said second-mentioned electronic tube; and a relay in the plate circuit of said normally non-conducting gas filled tube, said normally non-conducting gas filled tube becoming conducting upon an unbalance in said bridge circuit beyond a predetermined amount.

8. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; an electronic tube amplifier having a cathode, plate, and control grid; means to connect said control grid to one of the junctions of said bridge; a cathode resistance between said tube and the other junction of said bridge; a second electronic tube having a plate, cathode, and control grid; a source of direct current potential supplied by a rectifier bridge; a rectifier; means to connect said source of direct current potential and said rectifier in directions opposite to each other between the cathode of said first-mentioned electronic tube and the control grid of said second electronic tube; and means responsive to the flow of current in the plate circuit of said second-mentioned electronic tube, said flow being caused by an unbalance in said bridge beyond a predetermined amount.

9. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; an electronic tube amplifier having a cathode, plate, and control grid; means to connect said control grid to one of the junctions of said bridge; a cathode resistance between said tube and the other junction of said bridge; a second electronic tube having a plate, cathode, and control grid; a source of direct current potential supplied by a rectifier bridge; a rectifier; means to connect said source of direct current potential and said rectifier in directions opposite to each other between the cathode of said first-mentioned electronic tube and the control grid of said second electronic tube; a rectifier connected between said second-mentioned control grid and the cathode of said second-mentioned tube, said rectifier being connected to pass current in the direction of said grid and being connected between said grid and said first-mentioned rectifier; and means responsive to the flow of current in the plate circuit of said second-mentioned electronic tube, said flow being caused by an unbalance in said bridge beyond a predetermined amount.

10. An electrical testing apparatus comprising an electrical circuit; a bridge circuit having two sets of junctions; a normally electrically conductive article temporarily connectible in said bridge circuit and adapted to have current passed therethrough; a source of alternating current connected across one set of junctions of said bridge; a rectifier and a source of current opposing said rectifier connected in series across another set of junctions of said bridge; and a second rectifier connected across a set of signal leads and in series with said first-mentioned rectifier and source of current, said second rectifier being connected oppositely to said first rectifier and serving as a signal source.

11. An electrical testing apparatus comprising an electrical circuit; a Wheatstone bridge circuit; a normally electrically conductive article temporarily connected as one of the arms of the bridge; a source of alternating electric current connected across one pair of the junctions of the bridge; potential responsive means connected across the other pair of the junctions of the bridge, the potential responsive means including a rectifier and a source of direct current potential of predetermined magnitude in series opposition to the current passing path through the rectifiers; and signalling means connected to the rectifier whereby the existence of an unbalance potential adequate to outweigh the direct current potential may be detected.

12. An electrical testing apparatus comprising an electrical circuit; a bridge circuit having two sets of junctions; a normally electrically conductive article temporarily connectible in said bridge circuit and adapted to have current passed therethrough; a source of alternating current connected across one pair of junctions of said bridge; potential responsive means connected across the other pair of junctions of the bridge, said means including a rectifier and a source of direct current potential of predetermined magnitude connected in series with the rectifier and in opposition to the current passing path therethrough; and means connected to the rectifier responsive to outweighing of the source of predetermined potential by the effect of an unbalance potential across the bridge whereby departures of the resistance of the article beyond a predetermined tolerance relative to a desired standard may be detected.

13. In a conductivity testing machine for articles containing an explosive substance to be fired by passage of current through the explosive substance only, means to temporarily connect said article in a bridge circuit so that said explosive substance is a part of the electrical circuit thereof; means to supply a low voltage alternating current to said bridge; and means responsive to bridge unbalance potentials on either side of predetermined limits, said means being potential responsive in character and including a rectifier and a source of predetermined potential connected in series opposition to the rectifier.

14. A method of inspecting electrically conductive articles comprising the steps of inserting the article in one arm of a Wheatstone bridge; supplying alternating current to the bridge; applying the unbalance potential across the bridge to a circuit including a rectifier and a source of direct current potential of predetermined magnitude in series with the rectifier and opposed to the current passing path therethrough; and energizing responsive means connected to the rectifier whenever the application of the unbalance potential outweighs the direct current potential.

PAUL F. DARBY.

REFERENCES CITED

The following references are of record in the file of this patent:

UNITED STATES PATENTS

| Number | Name | Date |
|---|---|---|
| 939,553 | Cahuc | Nov. 2, 1909 |
| 1,586,253 | Anschutz-Kaempfe | May 25, 1926 |
| 1,665,397 | Wunsch | Apr. 10, 1928 |
| 1,743,386 | Paulson | Jan. 14, 1930 |
| 1,951,461 | Wilson | Mar. 20, 1934 |
| 2,039,267 | Barber | Apr. 28, 1936 |
| 2,077,833 | Gieringer | Apr. 20, 1937 |
| 2,312,357 | Odquist | Mar. 2, 1943 |

FOREIGN PATENTS

| Number | Country | Date |
|---|---|---|
| 26,639 | Great Britain | 1912 |